US 8,738,834 B2

(12) United States Patent
Scales et al.

(10) Patent No.: US 8,738,834 B2
(45) Date of Patent: *May 27, 2014

(54) METHOD AND APPARATUS FOR CONFIGURING ELECTRONIC DEVICES TO PERFORM SELECTABLE PREDEFINED FUNCTIONS USING DEVICE DRIVERS

(75) Inventors: James Scales, Hurst (GB); Varley Bullard, Hants (GB); Petri Syjala, Tampere (FI)

(73) Assignee: Nokia Corporation, Espoo (FI)

( * ) Notice: Subject to any disclaimer, the term of this patent is extended or adjusted under 35 U.S.C. 154(b) by 68 days.

This patent is subject to a terminal disclaimer.

(21) Appl. No.: 12/333,258

(22) Filed: Dec. 11, 2008

(65) Prior Publication Data

US 2009/0094400 A1    Apr. 9, 2009

Related U.S. Application Data

(63) Continuation of application No. 10/103,782, filed on Mar. 25, 2002, now abandoned.

(30) Foreign Application Priority Data

Mar. 28, 2001 (GB) .................................. 0107741.1

(51) Int. Cl.
*G06F 13/20* (2006.01)
(52) U.S. Cl.
USPC .......................................................... 710/313
(58) Field of Classification Search
USPC .......................................................... 710/313
See application file for complete search history.

(56) References Cited

U.S. PATENT DOCUMENTS

| | | | |
|---|---|---|---|
| 5,893,891 A * | 4/1999 | Zahedi | 623/24 |
| 6,003,097 A | 12/1999 | Richman et al. | |
| 6,005,613 A * | 12/1999 | Endsley et al. | 348/231.6 |
| 6,012,103 A | 1/2000 | Sartore et al. | |
| 6,085,265 A | 7/2000 | Kou | |
| 6,115,039 A * | 9/2000 | Karren et al. | 715/746 |
| 6,131,134 A | 10/2000 | Huang et al. | |
| 6,295,441 B1 * | 9/2001 | Bjorkengren | 455/575.3 |
| 6,557,033 B2 | 4/2003 | Maeda | |
| 6,625,472 B1 * | 9/2003 | Farazmandnia et al. | 455/557 |
| 6,704,824 B1 * | 3/2004 | Goodman | 710/300 |
| 6,806,977 B1 * | 10/2004 | Freeny et al. | 358/1.15 |
| 6,816,931 B2 * | 11/2004 | Shih | 710/62 |

(Continued)

FOREIGN PATENT DOCUMENTS

| | | |
|---|---|---|
| DE | 10031945 | 3/2001 |
| EP | 0 812 093 | 12/1997 |

(Continued)

OTHER PUBLICATIONS

Universal Serial Bus Specification, Revision 1.1, Sep. 23, 1998; pp. 4, 23, 29, 180, 215-216.*

(Continued)

*Primary Examiner* — Nimesh G Patel
(74) *Attorney, Agent, or Firm* — Locke Lord LLP

(57) ABSTRACT

A multifunctional mobile telephone handset is connected to a PC using a Universal Serial Bus. During bus enumeration, a device class descriptor is returned by the handset to the PC. The PC's operating system receives information relating to one of the functions of the handset and assigns an appropriate device driver.

21 Claims, 6 Drawing Sheets

(56) References Cited

U.S. PATENT DOCUMENTS

| | | | |
|---|---|---|---|
| 6,857,034 B1* | 2/2005 | DiSanza et al. | 710/106 |
| 7,099,490 B1 | 8/2006 | Fujita et al. | |
| 2002/0101515 A1* | 8/2002 | Yoshida et al. | 348/211 |
| 2002/0188887 A1 | 12/2002 | Largman et al. | |

FOREIGN PATENT DOCUMENTS

| | | |
|---|---|---|
| EP | 0905608 | 3/1999 |
| EP | 0905608 A1 | 3/1999 |
| EP | 1126378 | 8/2001 |
| EP | 1126378 A1 | 8/2001 |
| EP | 1 229 720 | 8/2002 |
| EP | 0 786 736 | 11/2003 |
| GB | 2 321 732 | 8/1998 |
| GB | 2 351 576 | 1/2001 |
| JP | 11-161444 | 6/1999 |
| JP | 2000194645 A | 7/2000 |
| JP | 200151938 A | 2/2001 |
| JP | 2000-305890 | 11/2002 |
| JP | 200935026 A | 2/2009 |
| WO | WO 97/19402 | 5/1997 |

OTHER PUBLICATIONS http://msdn.microsoft.com/en-us/library/ms791080.aspx.
http://www.microsoft.com/whdc/system/bus/usb/USBFAQ_intermed.mspx.
http://www.microsoft.com/whdc/system/bus/usb/USBFAQ_intro.mspx.
Nokia 6300 User Guide, date unknown.
English Translation of Office Action for Japanese Patent Application Serial No. 2009-186736, dated Jul. 8, 2011.
English Translation of Japanese Office Action dated Aug. 5, 2013 for Japanese Patent Application No. 2011-219815—5 pages.
"Universal Serial Bus Specification", Revision 2.0, Apr. 27, 2000, 38 pages.
"Universal Serial Bus Common Class Specification", Revision 1.0, Dec. 16, 1997, 16 pages.
Axelson, J., "USB Complete—Everything You Need to Develop Custom USB Peripherals", Lakeview Research, Madison, WI, 1999, 39 pages.
Axelson, J., "USB Komplett—Alles, was Sie zur Entwicklung benutzerdefinierter USB-Peripheriegerate benotigen", Lakeview Research, Madison, WI, 1999, 42 pages.
"USB Feature Specification: Dynamic Logical-Device", Intel Corporation, Revision 1.0, Oct. 27, 1999, 14 pages.
USB-Implementierungsspezifikation: Dynamic Logical-Device [Dynamisches Logikgerat], Intel Corporation, Revision 1.0, Oct. 27, 1999, 14 pages.
"Digital Still Camera", Sony Corporation, 2001, 208 pages.
"Sony DSC-S75 Review", Digital Photography Review, 2001, downloaded from http://www.dpreview.com/reviews/sonydscs75/ on 12.08.2013, 3 pages.
"Digital Cameras—Sony DDC-S75 Digital Camera Review", 2001, downloaded from http://www.imaging-resource.com/PRODS/S75/S75P.htm on Dec. 8, 2013, 21 pages.
"Review: Overview—Sony DSC-S75", Steve's Digicams, 2001, downloaded from http://www.stevesdigicams.com/camera-reviews/sony/dsc-s75 on Dec. 8, 2013, 7 pages.
"S75: A-Digital-Eye.com first impressions", Digital Photography Review, Sony Cyber-shot Talk Forum, 2001, downloaded from http://www.dpreview.com/forums/post/944604 on Dec. 8, 2013, 2 pages.
"Pma 2001 Special Report", Digital Camera Resource p., 2001, downloaded from http://www.dcresource.com/specials/pma_2001.shtml on Dec. 8, 2013, 9 pages.
"PMA 2001 show report: Section four", Digital Photography Review, 2001, downloaded from http://www.dpreview.com/news/2001/02116/pma04/print on Dec. 8, 2013, 8 pages.
"PMA 2001 Show, NEWS!—Sony announce numerous new digital cameras!", 2001, downloaded from http://www.imaging-resource.com/EVENTS/PMAS01/981759700.html on Dec. 8, 2013, 2 pages.

* cited by examiner

| | | |
|---|---|---|
| bmRequestType | 10000000B | — 53 |
| bRequest | GET_DESCRIPTOR | — 54 |
| wValue | DEVICE | — 55 |
| wIndex | 0 | — 56 |
| wLength | | — 57 |
| data | | — 58 |

FIG. 10

| | | |
|---|---|---|
| bLength | 10000000B | — 59 |
| bDescriptorType | DEVICE | — 60 |
| bcdUSB | 210H | — 61 |
| bDeviceClass | 02 | — 62 |
| bDeviceSubClass | | — 63 |
| dDeviceProtocol | | — 64 |
| bMaxPachetSize | | — 65 |
| idVendor | | — 66 |
| idProduct | | — 67 |
| bcdDevie | | — 68 |
| iManufacturer | | — 69 |
| iProduct | | — 70 |
| iSerialNumber | | — 71 |
| bNumConfiguration | | — 72 |

FIG. 11

METHOD AND APPARATUS FOR CONFIGURING ELECTRONIC DEVICES TO PERFORM SELECTABLE PREDEFINED FUNCTIONS USING DEVICE DRIVERS

CROSS-REFERENCE TO RELATED PATENT APPLICATIONS

United Kingdom Priority Application 0107741.1, filed Mar. 28, 2001 including the specification, drawings, claims and abstract, is incorporated herein by reference in its entirety. This application is a Continuation of U.S. application Ser. No. 10/103,782, filed Mar. 25, 2002, incorporated herein by reference in its entirety.

FIELD OF THE INVENTION

The present invention relates to a method of configuring electronic devices, having particular although not exclusive application to configuring a Universal Serial Bus device and a host.

BACKGROUND ART

A Universal Serial Bus (USB) standard has been developed which allows up to 127 peripheral devices such as printers, scanners, keyboards, modems, cameras and storage devices to be attached to a host, usually a personal computer (PC), through a 4-wire bus. These devices can be connected to the PC either directly or via hubs which provide additional connections. USB has the advantage that connection of different types of devices becomes standardised. Furthermore, a device can be connected while the PC is switched on and while other devices are in use. USB supports user data rates of up to 8 Mbit/s for each device which is suitable for low to medium data rate applications. An overview of USB may be found in "USB Hardware & Software" by J. Garney et al. (Anna Books, 1998) [ISBN 0-929392-3-X]and a current version of the USB specification is available at www.usb.org or from USB-IF Administration, 5440 SW Westgate Drive, Suite 217, Portland, Oreg. 97221 USA.

A device is connected to a USB port provided by the PC or a hub. Once physically connected to the device, the PC controls attachment and configuration of the device. To achieve this, the PC is installed with a USB driver which is usually provided by the PC's operating system. The PC is also installed with a device driver to control the device once it is attached and configured so that application software on the PC can use the device. The device driver is often provided by the operating system although for unusual devices, a user may need to install a specific device driver using installation disks.

Devices fall into two main categories, namely hubs and functions. Hubs provide additional attachment points to the USB. Functions extend the capabilities of the computer. Most devices which are not a hub, such as a mouse, implement a single function. Some devices, such as a monitor having in-built speakers, implement multiple functions and have an embedded hub. Such a device is known as a compound device and appears to the PC as a hub with a collection of individual, non-removable functions.

The USB standard was originally designed to accommodate simple peripheral devices which fulfil a single function. When a single function device, such as a mouse, is plugged into a PC for the first time, the USB driver detects, identifies and configures the device and the operating system automatically assigns a device driver, which in the case of a mouse is a mouse driver. Alternatively, a user may install and/or assign a specific device driver. When a compound device is plugged in for the first time the same process of detection, identification and configuration is carried out for each respective function so that all the functions of the compound device are available to the PC.

However, a problem arises if a device implements multiple disconnectable functions. Such a device appears to the PC as a single function device. When the device is plugged into the PC for the first time, the operating system assigns a device driver according to this function. Once assigned, the device is tied to the device driver so that whenever the device is disconnected from the PC and then reconnected, the same device driver is assigned to the device. This abrogates the multifunctionality of the device.

The present invention seeks to help overcome this problem.

SUMMARY OF THE INVENTION

According to a first aspect of the present invention there is provided a method of configuring first and second electronic devices, said second device being able to perform a plurality of predefined functions, the method comprising receiving, at said second device, preference information relating to one of said plurality of functions of said second device, providing said first device with information relating to said one function and providing, at said first device, an interface for interfacing with said one function so as to allow said first device to use said one function.

The first device may be a Universal Serial Bus host, such as a personal computer and the second device may be a Universal Serial Bus device, such as a mobile telephone handset.

The method may further comprise connecting said first and second devices together by a bus for transmitting signals and exchanging configuration signals between said first and second devices through said bus for establishing addressable communication between said first and second devices. The exchange of configuration signals may include said provision of information relating to said one function. The provision of information may comprise sending a message from said second device to said first device. The provision of information may include providing data identifying said one function.

The method may comprise said first device requesting information from said second device.

The provision of said interface may comprise assigning a device driver and may comprise executing a computer program.

According to a second aspect of the present invention there is provided a method of using data processor for communication with an electronic device, the method comprising receiving first information relating to a first function of said device, providing a first interface for interfacing with said first function so as to allow said data processor to use said first function, receiving second information relating to a second function of said device and providing a second interface for interfacing with said second function so as to allow said data processor to use said second function in preference to said first function.

According to a third aspect of the present invention there is provided a method of configuring an electronic device for communication with data processor, the method comprising receiving preference information relating to one of a plurality of predefined functions of said device and providing information relating to a first function to said data processor. The method may further comprise allowing said data processor to use said one function.

According to a fourth aspect of the present invention there is provided a computer program comprising computer code for a data processor configured for communication with an electronic device, to make said data processor receive preference information relating to a first function of said device, provide a first interface for interfacing with said first function so as to allow said data processor to use said function, receive second information relating to a second function of said device and provide a second interface for interfacing with said second function so as to allow said data processor to use said second function in preference to said first function.

According to a fifth aspect of the present invention there is provided a computer program comprising computer code for an electronic device able to perform a plurality of predefined functions and configured for communication with a data processor, to make said device receive information relating to one of said plurality of functions and provide information relating to said function to said data processor. The program may further make said device allow said data processor to use said one function.

According to a sixth aspect of the present invention there is provided an apparatus comprising first and second electronic devices, said second device being able to perform a plurality of functions, said apparatus including an input for receiving preference information relating to one of said plurality of functions of said second device, a link for providing to said first device information relating to said one function and a controller for providing an interface for interfacing with said one function so as to allow said first device to use said one function.

The first device may be Universal Serial Bus host, such as a personal computer and the second device may be a Universal Serial Bus device, such as a mobile telephone handset.

According to a seventh aspect of the present invention there is provided an electronic device which is able to perform a plurality of function comprising an input for receiving preference information relating to one of said plurality of functions and an output for providing to another device information relating to said one function. The device may further comprise a link for allowing said other device to use said one function. The device may be a mobile telephone handset.

According to an eighth aspect of the present invention there is provided a Universal Serial Bus device able to perform a plurality of predefined functions comprising an input for receiving preference information relating to one of said plurality of functions and output for providing to a host information relating to said one function. The device may further comprise a link for allowing said host to use said to use said one function. The device may be a mobile telephone handset.

BRIEF DESCRIPTION OF THE DRAWINGS

An embodiment of the present invention will now be described, by way of example, with reference to the accompanying drawings in which:

FIG. 10 is a schematic diagram of a request for a device descriptor and

FIG. 11 is a schematic diagram of a device descriptor.

PREFERRED EMBODIMENT OF THE INVENTION

Figure 1:
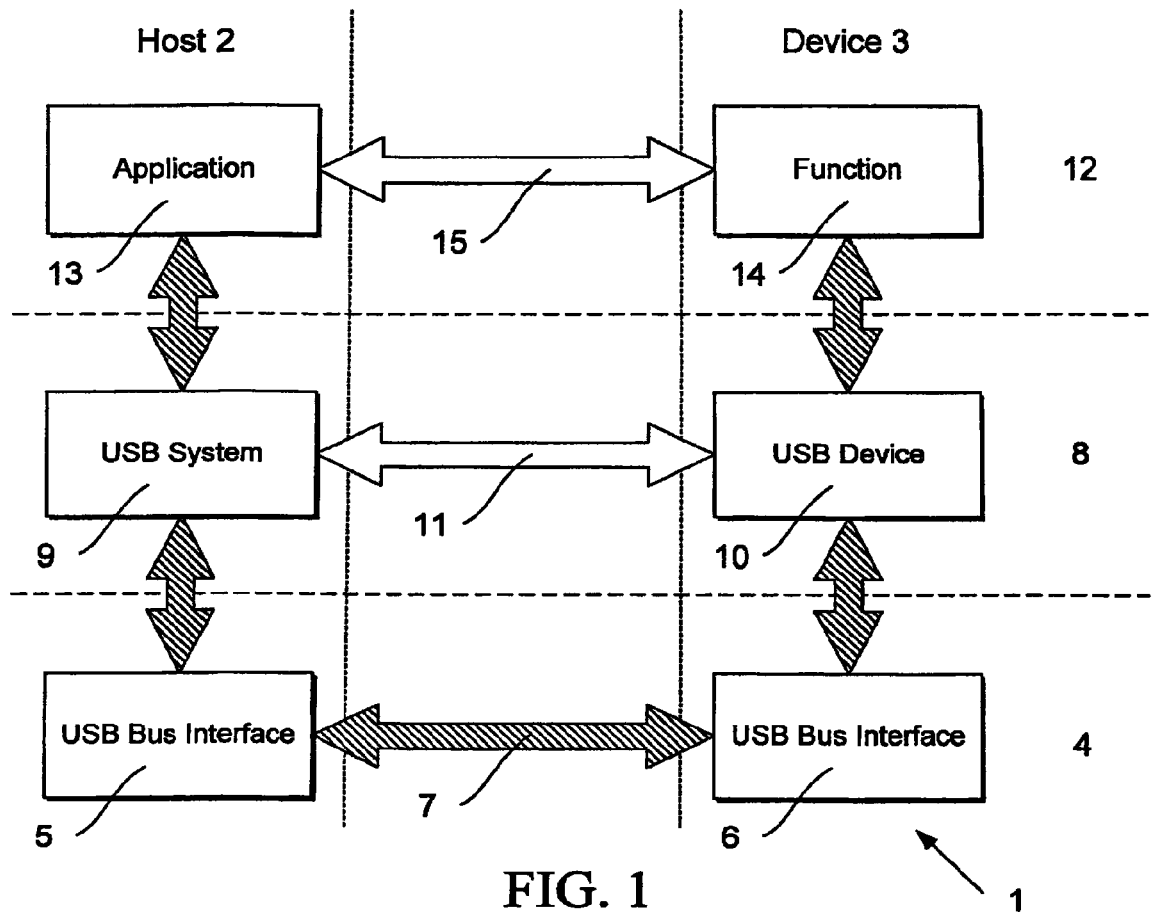
FIG. 1 is schematic diagram of a general Universal Serial Bus (USB) arrangement.

Referring to FIG. 1, a general USB arrangement 1 comprises a host 2, such as a personal computer (PC), connected to a peripheral device 3, for instance a mouse, by means of a Universal Serial Bus (uSB). The USB comprises hardware and software which allows a capability of the device 3, in this example cursor control, to be provided to the host 2. In FIG. 1, the USB arrangement 1 is represented as a three-layered communication system.

A bottom layer 4 handles the electrical connection between the host 2 and the device 3. The host 2 and device 3 each have USB interfaces 5, 6 providing ports (not shown) by which they are connected using a USB cable 7.

A middle layer 8 is concerned with controlling data transfer between the host 2 and device 3. A USB system 9 on the host side is responsible for managing the USB by coordinating with a USB device 10 on the device side. In order to establish a connection and to configure the device 3, a logical control link, called a default pipe 11, is defined.

A top layer 12 is concerned with utilisation of the device 3. Application software 13 on the host 2 interfaces with a function 14 of the device 3 through a logical connection called a pipe 15.

Further information regarding the USB arrangement may be found in Chapter 10 of the USB Specification Revision 2.0.

Figure 2:
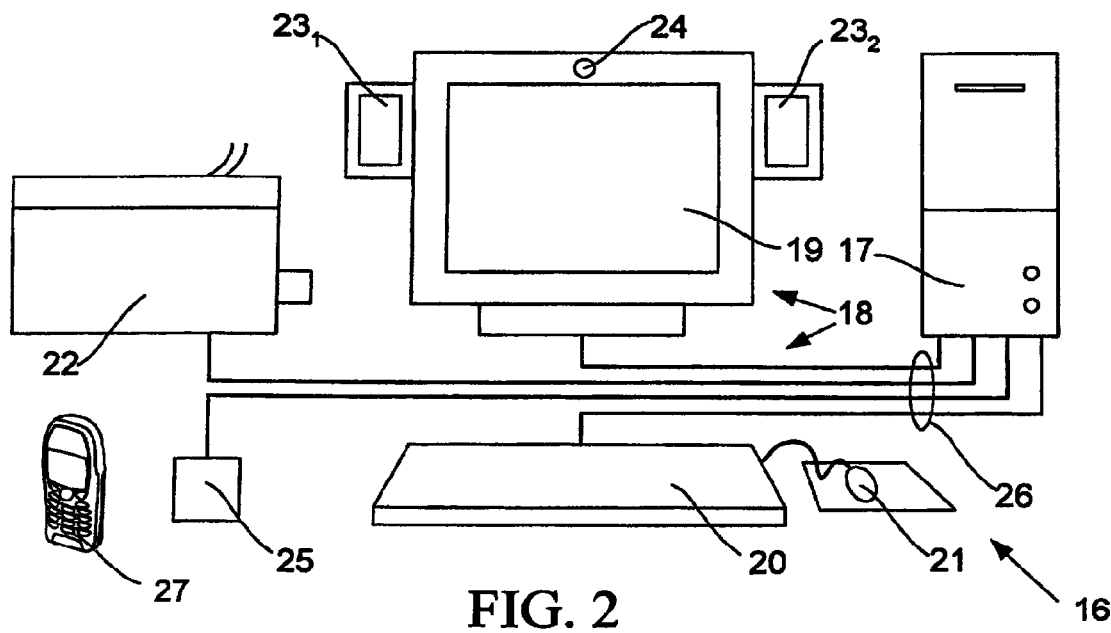
FIG. 2 shows a personal computer (PC) and peripheral devices attached to the computer using a USB.

Referring to FIG. 2, a PC system 16 comprises a PC 17 connected to a plurality of peripheral devices 18 including a monitor 19, a keyboard 20, a mouse 21, a printer 22, first and second speakers 23$_1$, 23$_2$, a microphone 24 and a USB hub 25 using the USB. A plurality of USB cables 26 connect the PC 17 to the peripheral devices 18. The USB hub 25 provides a means for connecting a mobile telephone handset 27 to the PC 17.

Figure 3:
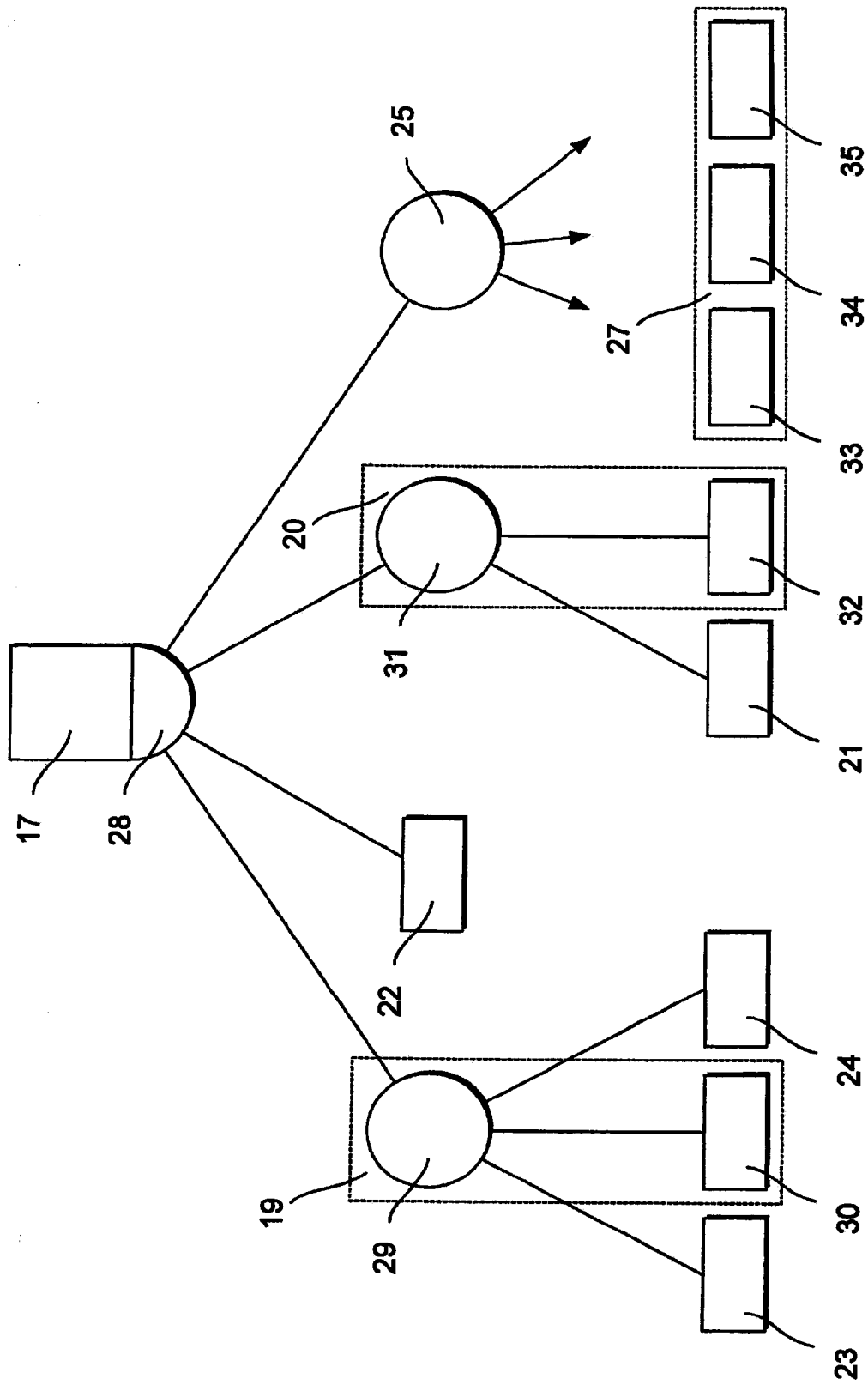
FIG. 3 shows a bus topology for the apparatus shown in FIG. 2.
Figure 5:
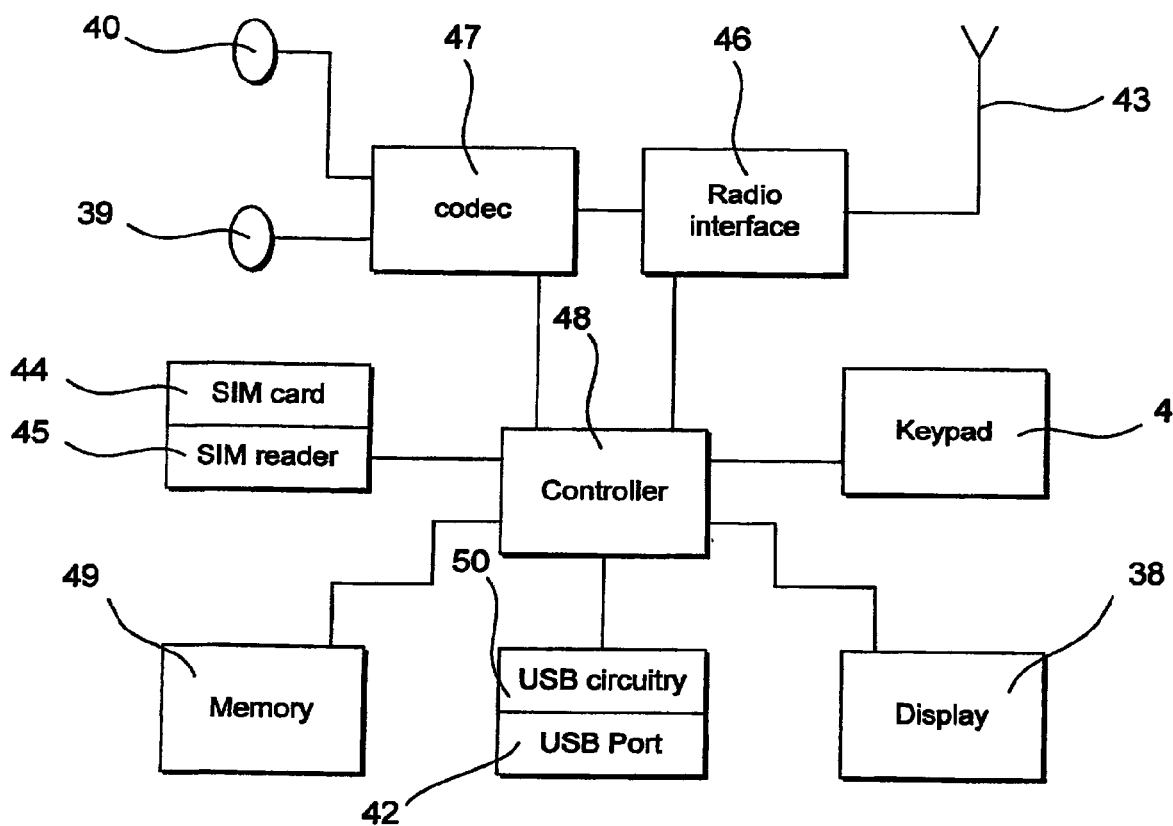
FIG. 5 is a schematic diagram of mobile telephone circuitry of the handset shown in FIG. 4.

Referring to FIG. 3, the PC 17 serves as the USB host and has a hub, called a root hub 28, directly connected to it, for extending the USB. In this example, the root hub 28 provides four ports (not shown). The monitor 19 is a compound device having an embedded hub 29 and implements a monitor function 30. The keyboard 20 is also a compound device having an embedded hub 31 and implements a keyboard function 32. The mobile telephone handset 27 is multifunctional In this example, it has a microphone function 33 for providing audio signals, a modem 34 for dial-up networking and a controller 35 for implementing Infrared Data Association's (IrDA) Object Exchange Protocol (OBEX) which allows to synchronising of personal information management (PIM). In this example, functions such as the modem 34 and the controller 35 are implemented in software by the handset's controller (FIG. 5). It will be appreciated that other functions may be implemented in the handset 27.

The monitor 19, keyboard 20, mouse 21, printer 22, speakers 23$_1$, 23$_2$, and the microphone 24 are attached to the PC 17 and configured in manner well known per se.

Figure 4:
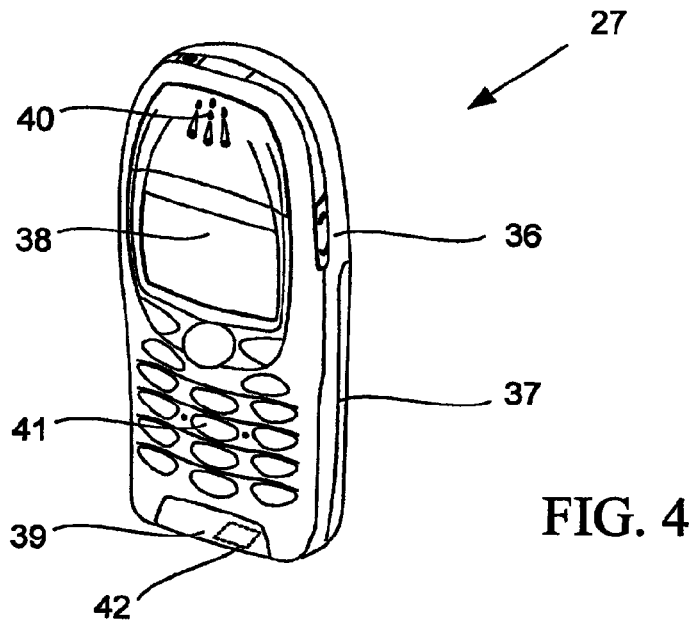
FIG. 4 shows a perspective view of a mobile telephone handset.

Referring to FIGS. 4 and 5, the mobile telephone handset 27 comprises a casing 36, a battery pack 37, liquid crystal display (LCD) panel 38, a microphone 39, an earpiece 40, keypad 41, USB port 42, antenna 43, subscriber identification module (SIM) card 44 and SIM card reader 45. Mobile telephone circuitry includes radio interface circuitry 46, codec circuitry 47, controller 48, memory 49 and USB transceiver circuitry 50. The USB transceiver circuitry 50, together with the USB port 34 provide the hardware for implementing a device USB interface (FIG. 1).

A method by which a user can select a function of the mobile telephone handset 27 and attach the handset 27 to the PC 17 so that it is configured with an appropriate device driver will now be described.

Figure 6:
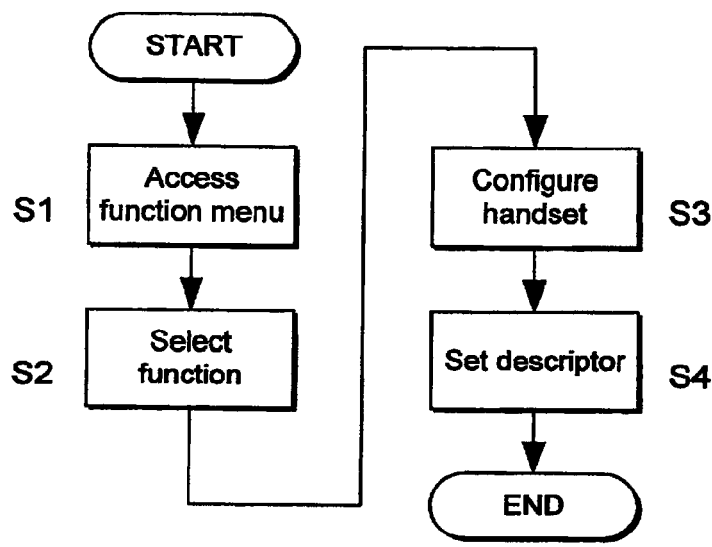
FIG. 6 is a process flow diagram by which a user is allowed to select a function of the mobile telephone handset shown in FIG. 4.

Referring to FIG. 6, the handset 27 receives preference information relating to one of the plurality of functions 33, 34, 35 the user enters a functions menu on the handset 27 (step S1) and selects one of a plurality of functions which the handset can execute (step S2). In this example, the user wants to access a dial-up internet service provider and so they select the modem function 34. A handset operating system configures the handset (step S3). In addition, the controller 48 sets a pointer to one of a plurality of device descriptors DEVICE held in memory 49 corresponding to the modem function 34 (step S4). The nature and purpose of the device descriptors DEVICE will be described in more detail hereinafter. It will be appreciated that electromechanical switches may be used to select one of the functions 33, 34, 35.

Figure 7:
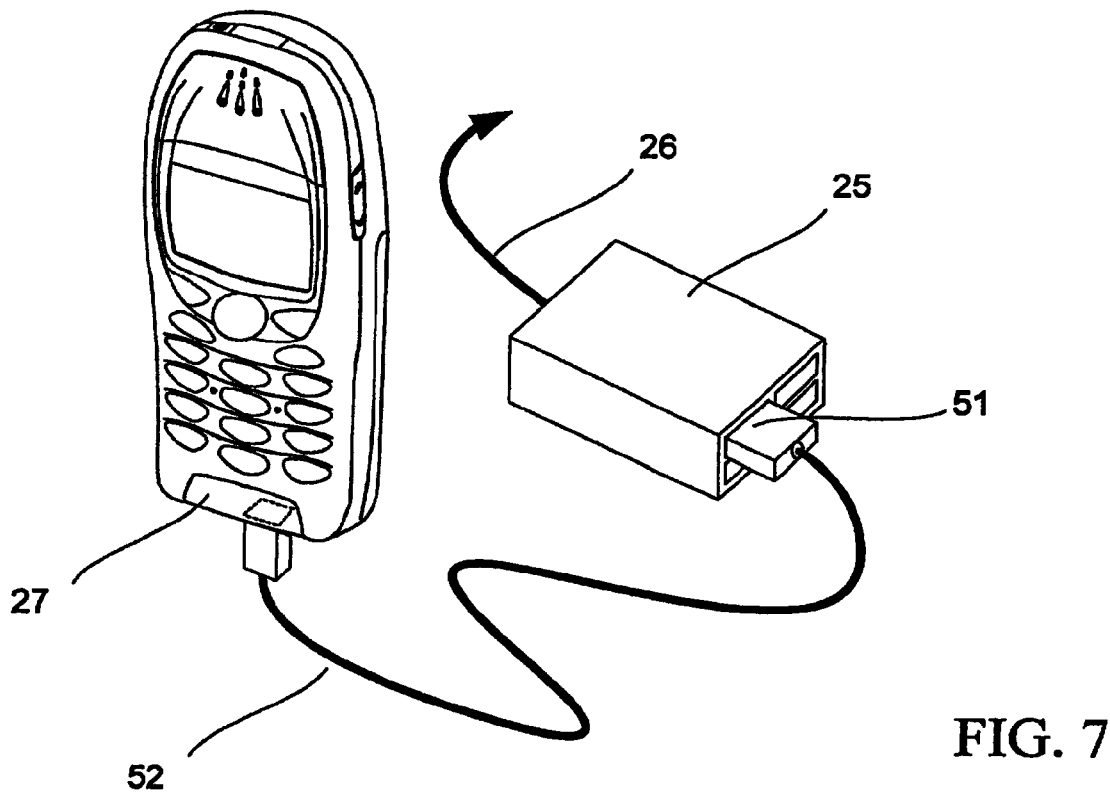
FIG. 7 shows the mobile telephone handset shown in FIG. 4 being connected to a USB hub.
Figure 8:
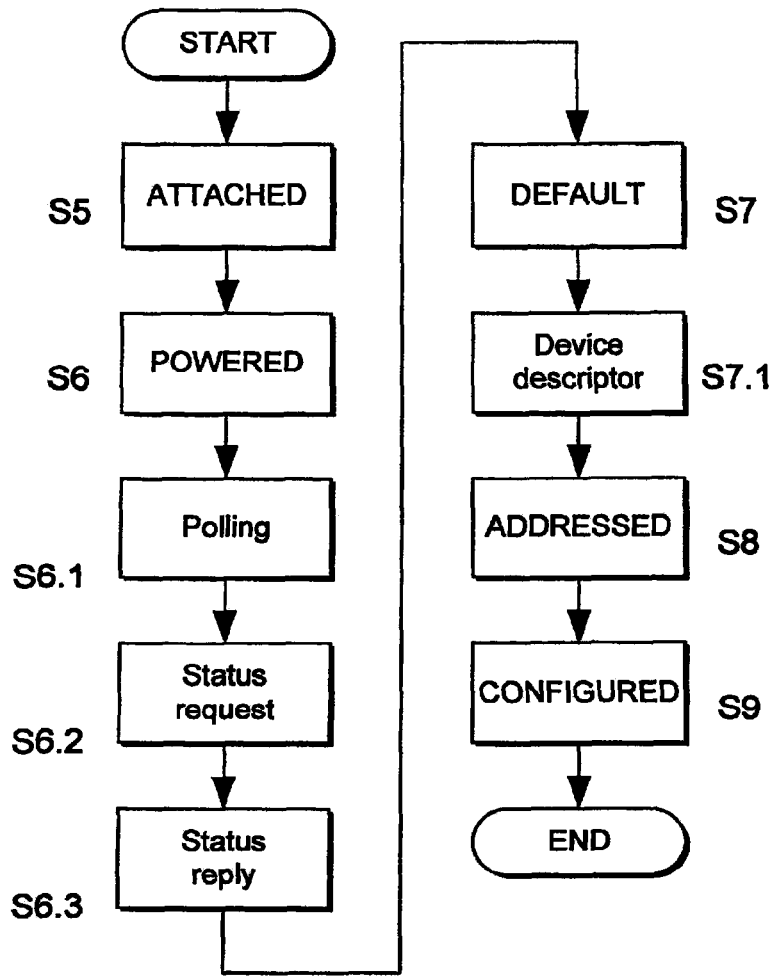
FIG. 8 is a process flow diagram by which the mobile telephone handset shown in FIG. 7 is attached and configured to the PC shown in FIG. 2.

Referring to FIGS. 7 and 8, the user attaches the handset 27 to one of four hub ports 51 using a USB cable 52 and bus enumeration takes place. The USB hub 25 senses that the handset 27 has been connected to one of the four ports 51 and changes the state of the port from disconnected to connected (step S5). The handset 27 provides its own power and so is deemed to be in a powered state (step S6). The PC 17 periodically polls the USB hub 25, which indicates that there is a change in status of one of the four hub ports 51 (step S6.1). The PC 17 issues commands to hub 25 to indicate the nature of change (step S6.2) and the hub replies with the identity of the port (step S6.3). The PC 17 issues a port enable signal and sends a reset command (step S7). At this point, the port 51 to which the handset 27 is connected is enabled and the handset 27 is in a default state and is addressable only through a default pipe at a default address. The PC 17 and the handset 27 exchange descriptor information (step S7.1) which will be described in greater detail below. At this point the PC 17 is informed which function 33, 34, 35 the handset 27 implements and selects an appropriate device driver. The PC 17 assigns a unique address to the handset 27 (step S8). At this stage the handset 27 is in an addressed state. The PC 17 reads configuration information from the handset (step S9). The handset 27 is now configured and the PC 17 can receive data from it.

The exchange of descriptor information at step S7.1 above will now be described.

Figure 9:
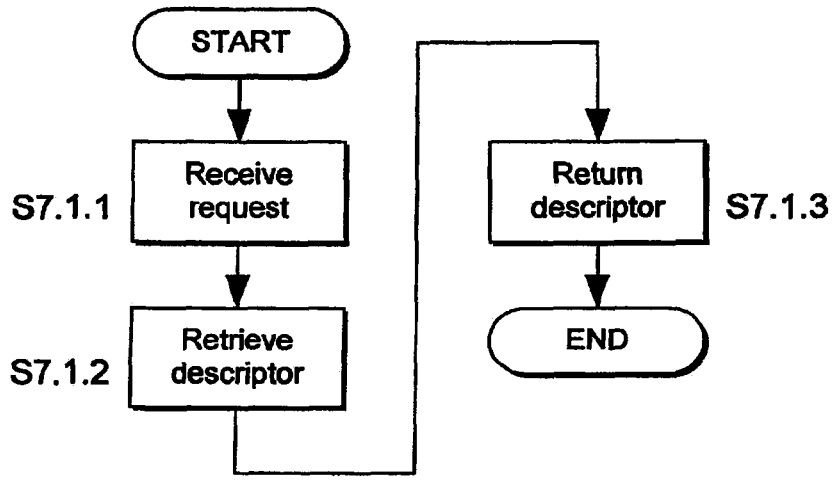
FIG. 9 is a process flow diagram of the mobile telephone handset and PC of FIG. 8 exchanging device information.

Referring to FIGS. 9 and 10, the PC 17 sends a request GET_DESCRIPTOR over the default pipe to the handset 27 (step S7.1.1). The request GET_DESCRIPTOR comprises a request type field 53, a request field 54, a descriptor type 55 which in this example is set to "device", a descriptor index field 56 which is set to zero, a length field 57 which specifies the number of bytes which the handset should return and a data field 58.

Referring to FIGS. 9 and 11, the handset 27 looks up the device descriptor DEVICE from memory 49 (Step S7.1.2) and returns it to the PC 17 (step S7.1.3). The device descriptor comprises a length field 59, a descriptor type field 60, a USB specification release number field 61, a device class code field 62, a device sub-class code field 63, a protocol code field 64, a maximum packet size field 65, a vendor ID field 66, a product ID field 67, a device release number field 68, an index of string descriptor 69 describing the manufacturer, an index of string descriptor describing the product 70, an index of string descriptor describing the device's serial number 71 and a field indicating the number of possible configurations 72. In this example, the device class code field 62 is set to 02 indicating a modem.

Once the USB system (see FIG. 1) of the PC 17 receives the device descriptor DEVICE through the default pipe, it passes information relating to the device class 62 to the PC's operating system. The PC's operating system selects and assigns a modem driver in a manner well known per se. Alternatively, the operating system may prompt the user to install a modem driver. Once the modem driver is installed and appropriate browser software is operating, the PC 17 is able to control the modem 34 and receive data.

If the user disconnects the handset 27 and wishes to use a different function, such as the microphone function 33, they re-enter the functions menu on the handset 27 and select the microphone function (steps S1-S5). When handset 27 is re-attached to the PC 17, a different device descriptor DEVICE is returned to the PC 17 during bus enumeration and so a different driver, this time a microphone driver, is assigned.

This has the advantage that all the functions of the handset 27 are available to PC 17 and are easily configured by the user.

It will be appreciated that many modifications may be made to the embodiments hereinbefore described. Instead of a PC, the host may be another mobile telephone handset, a games console or a network computer. The device need not be a mobile telephone handset, but a data communicator or another PC.

What is claimed:

1. A method of providing communication between a mobile device and a host device, comprising:
receiving, at the mobile device, preference information indicating the user-selection of one particular function from a plurality of different user-selectable predefined functions of the mobile device, wherein each of the respective different functions of the mobile device is:
useable by a host device only when the host device is in a communication configuration with that given respective function of the mobile device; and
associated with respective corresponding driver information that is able to allow a communication configuration to be established between the host device and that respectively associated function of the mobile device;
providing the host device with the preference information indicating the particular selected function of the mobile device so as to cause the host device to assign corresponding driver information associated with that particular selected function, irrespective of whether any other function of the plurality of different user-selectable predefined functions of the mobile device has previously been interfaced with the host device; and
establishing the communication configuration between the host device and that particular selected function of the mobile device via the assigned driver information to thereby interface the host device with the particular selected function of the mobile device through the communication configuration so as to allow the host device to be able to use the particular selected function of the mobile device.

2. A method according to claim 1, further comprising:
connecting the mobile device to the host device so as to establish a first communication configuration for communication between the host device and the mobile device prior to receiving, at the mobile device, said preference information.

3. A method according to claim 2, in which the preference information relating to the particular selected function is a particular device descriptor associated with that particular selected function, wherein the mobile device is configured to have a different device descriptor for each function of the plurality of different user-selectable predefined functions.

4. A method according to claim 3, comprising the mobile device using the first communication configuration to provide the device descriptor which relates to the particular selected function.

5. A method according to claim 3, comprising the host device requesting the device descriptor associated with the one different user-selected predefined function from the mobile device.

6. A method according to claim 2, wherein the first communication configuration is a default non-addressed communication configuration.

7. A method according to claim 6, comprising using a default pipe provided by Universal Serial Bus enumeration in establishing the first communication configuration.

8. A method according to claim 7, comprising providing a second addressed communication configuration after full Universal Serial Bus enumeration of the mobile device and the host device, the second communication configuration providing for use of the particular selected function of the mobile device by the host device.

9. A method according to claim 8, comprising only assigning a unique address to the mobile device to provide for the second addressed communication configuration.

10. A method according to claim 6, comprising user selection of one particular function from the different user-selectable predefined functions being communicated using the first default non-addressed communication configuration to provide the host device with the preference information, the preference information being a device descriptor which indicates that particular selected function.

11. A method according to claim 1, comprising pre-selecting one of the plurality of different user-selectable predefined functions prior to connecting the host and mobile device together.

12. A method according to claim 1, wherein the host device is a Universal Serial Bus host.

13. A method according to claim 1, wherein the mobile device is a Universal Serial Bus device selected from a group consisting of: a mobile telephone handset and a device comprising mobile radiotelephone functionality.

14. A method as claimed in claim 1, wherein the mobile device is a multifunctional non-compound device.

15. The method of claim 1, wherein the user-selection of the one particular function is performed by a user operating a menu of the mobile device.

16. The method of claim 15, wherein said user-selection causes setting of a pointer configured to point to the particular device descriptor associated with the particular selected function.

17. The method of claim 1, wherein the establishing a communication configuration comprises forcing the host device to assign said corresponding driver information.

18. The method of claim 1, wherein providing the host device with the preference information is performed over a single Universal Serial Bus communication channel forming a connection between the host device and the mobile device.

19. A mobile device, comprising:
respective circuitries for performing a plurality of different user-selectable predefined functions, wherein each of the respective different functions of the mobile device is:
useable by a host device only when the host device is in a communication configuration with that given respective function of the mobile device; and
associated with respective corresponding driver information that is able to allow a communication configuration to be established between the host device and that respectively associated function of the mobile device; and
controller circuitry, wherein the controller circuitry is configured to perform at least:
receiving preference information indicating the user-selection of one particular function from the plurality of different user-selectable predefined functions of the mobile device;
providing a host device with the preference information indicating the particular selected function of the mobile device so as to cause the host device to assign corresponding driver information associated with that particular selected function, irrespective of whether any other function of the plurality of different user-selectable predefined functions of the mobile device has previously been interfaced with the host device; and
establishing the communication configuration between the host device and that particular selected function of the mobile device via the assigned driver information to thereby interface the host device with the particular selected function of the mobile device through the communication configuration so as to allow the host device to be able to use the particular selected function of the mobile device.

20. A method as claimed in claim 1, wherein the mobile device is a slave device.

21. A computer program, embodied on a non-transitory computer-readable medium, the computer program comprising:
program code configured to receive, at a mobile device, preference information indicating the user-selection of one particular function from a plurality of different user-selectable predefined functions of the mobile device, wherein each of the respective different functions of the mobile device is:
useable by a host device only when the host device is in a communication configuration with that given respective function of the mobile device; and
associated with respective corresponding driver information that is able to allow a communication configuration to be established between the host device and that respectively associated function of the mobile device;
program code configured to provide the host device with the preference information indicating the particular selected function of the mobile device so as to cause the host device to assign corresponding driver information associated with that particular selected function, irrespective of whether any other function of the plurality of different user-selectable predefined functions of the mobile device has previously been interfaced with the host device; and
program code configured to establish the communication configuration between the host device and that particular selected function of the mobile device via the assigned driver information to thereby interface the host device with the particular selected function of the mobile device through the communication configuration so as to allow the host device to be able to use the particular selected function of the mobile device.

* * * * *

UNITED STATES PATENT AND TRADEMARK OFFICE
CERTIFICATE OF CORRECTION

PATENT NO. : 8,738,834 B2  
APPLICATION NO. : 12/333258  
DATED : May 27, 2014  
INVENTOR(S) : James Scales, Varley Bullard and Petri Syrjala Page 1 of 1

It is certified that error appears in the above-identified patent and that said Letters Patent is hereby corrected as shown below:

On the title page, item "(75) Inventors:" correct the last name of the third inventor as follows:

Petri "Syjala" should read as Petri --Syrjala--.

Signed and Sealed this  
Seventeenth Day of March, 2015

Michelle K. Lee  
*Director of the United States Patent and Trademark Office*